US011443606B2

(12) United States Patent
Baker

(10) Patent No.: US 11,443,606 B2
(45) Date of Patent: *Sep. 13, 2022

(54) FIREARM REGULATION SYSTEM AND RELATED METHODS

(71) Applicant: Talknowledge, LLC, Tucson, AZ (US)

(72) Inventor: Christopher Baker, Tucson, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/202,058

(22) Filed: Mar. 15, 2021

(65) Prior Publication Data

US 2021/0225150 A1 Jul. 22, 2021

Related U.S. Application Data

(63) Continuation of application No. 16/832,381, filed on Mar. 27, 2020, now Pat. No. 10,950,111.
(Continued)

(51) Int. Cl.
*G08B 21/02* (2006.01)
*G08B 3/00* (2006.01)
(Continued)

(52) U.S. Cl.
CPC ............ *G08B 21/02* (2013.01); *F41A 17/063* (2013.01); *F41A 17/08* (2013.01); *G06F 3/016* (2013.01); *G07C 9/00309* (2013.01); *G08B 3/00* (2013.01); *H01Q 1/2208* (2013.01); *H04B 7/155* (2013.01); *H04L 12/2854* (2013.01); *H04W 4/021* (2013.01); *H04W 4/023* (2013.01); *H04W 4/80* (2018.02); *H04W 68/005* (2013.01); *G07C 2009/00515* (2013.01)

(58) Field of Classification Search
None
See application file for complete search history.

(56) References Cited

U.S. PATENT DOCUMENTS 6,415,542 B1 * 7/2002 Bates ...................... F41A 17/06
42/70.05
6,856,238 B2 * 2/2005 Wootton ............... F41A 17/063
340/10.1
(Continued)

FOREIGN PATENT DOCUMENTS

WO 2014142920 A1 9/2014
WO 2016130386 A1 8/2016

OTHER PUBLICATIONS

Shaughnessy, et al., Family Practice Patients' Attitudes Toward Firearm Safety as a Preventive Medicine Issue: A Harnet Study, J. Am. Board Family Practice, Sep. 1, 1999, 6 pages.
(Continued)

*Primary Examiner* — Adolf Dsouza
(74) *Attorney, Agent, or Firm* — Adam R. Stephenson, Ltd.

(57) ABSTRACT

Implementations of firearm regulation systems may include a firearm safety system (FSS) configured to physically couple to a firearm. The FSS may include a locking mechanism configured to prevent the firearm from firing and a sensor configured to detect an environmental parameter. The firearm regulation system may also include a management system communicatively coupled to the FSS and a site safety system (SSS) communicatively coupled to the management system. The SSS may include one or more lockdown mechanisms.

19 Claims, 11 Drawing Sheets

Related U.S. Application Data

(60) Provisional application No. 62/824,916, filed on Mar. 27, 2019.

(51) Int. Cl.
| | |
|---|---|
| *G07C 9/00* | (2020.01) |
| *F41A 17/08* | (2006.01) |
| *F41A 17/06* | (2006.01) |
| *G06F 3/01* | (2006.01) |
| *H04L 12/28* | (2006.01) |
| *H04W 68/00* | (2009.01) |
| *H04W 4/02* | (2018.01) |
| *H04W 4/80* | (2018.01) |
| *H01Q 1/22* | (2006.01) |
| *H04B 7/155* | (2006.01) |
| *H04W 4/021* | (2018.01) |

(56) References Cited

U.S. PATENT DOCUMENTS

| | | | |
|---|---|---|---|
| 2014/0202058 A1* | 7/2014 | Zhou | F41A 17/063 |
| | | | 42/70.11 |
| 2014/0366421 A1 | 12/2014 | Arif et al. | |
| 2017/0108301 A1 | 4/2017 | Murphy, II et al. | |

OTHER PUBLICATIONS

International Search Report, PCT Patent Application No. PCT/US2020/025245, dated Jul. 15, 2020, 2 pages.

\* cited by examiner

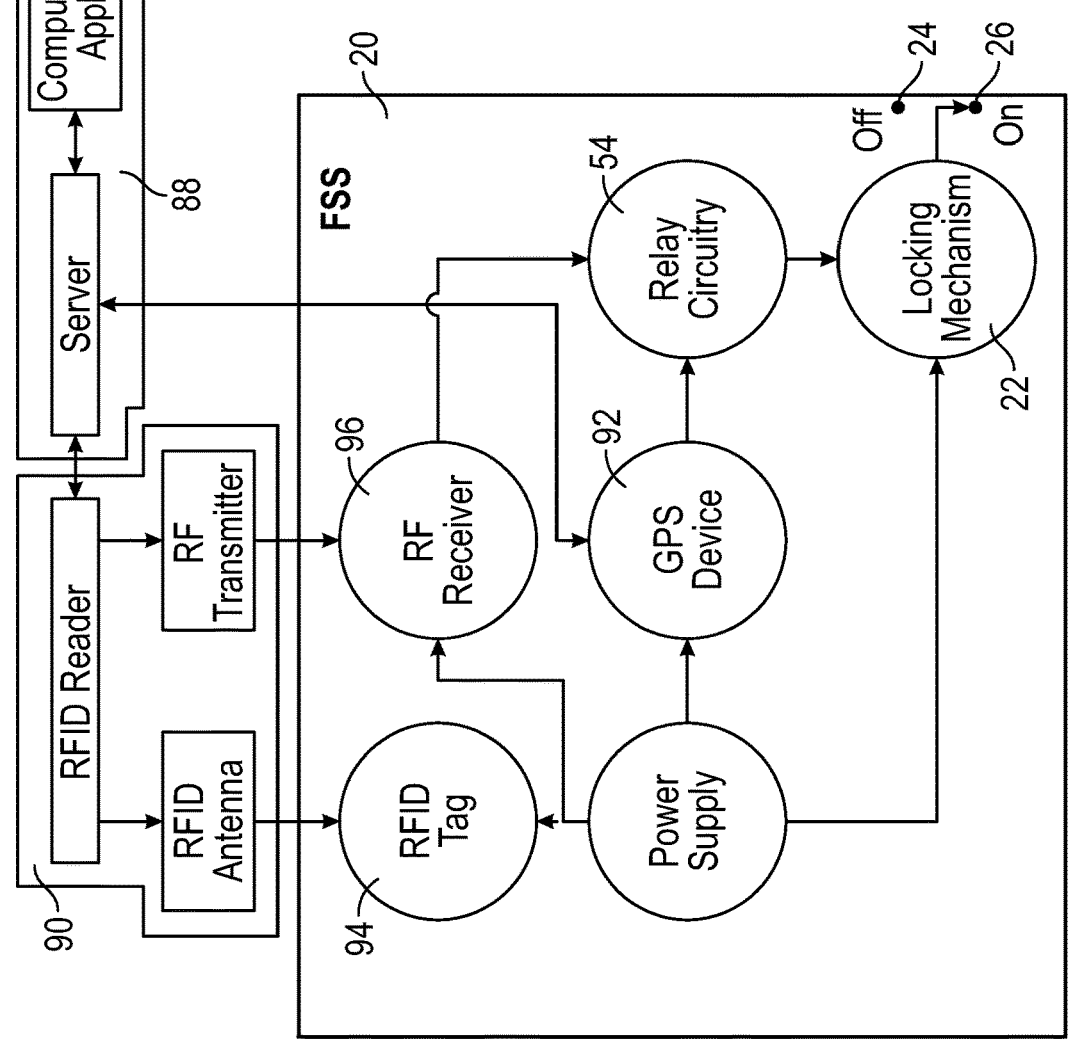
FIG. 3
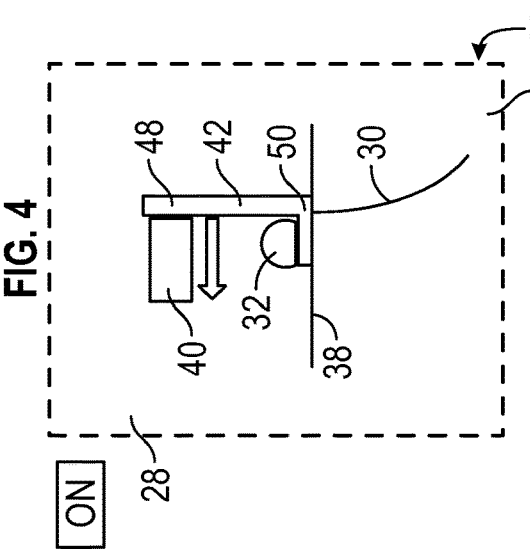
FIG. 4
FIG. 5

FIREARM REGULATION SYSTEM AND RELATED METHODS

CROSS REFERENCE TO RELATED APPLICATIONS

This document claims the benefit of the filing date of U.S. Provisional Patent Application 62/824,916, entitled "Firearm Regulation System and Related Methods" to Baker which was filed on Mar. 27, 2019, the disclosure of which is hereby incorporated entirely herein by reference.

This application is a continuation application of the earlier U.S. Utility Patent Application to Baker entitled "Firearm Regulation System and Related Methods," application Ser. No. 16/832,381, filed Mar. 3, 2020, now pending, the disclosure of which is hereby incorporated entirely herein by reference.

BACKGROUND

1. Technical Field

Aspects of this document relate generally to firearm management systems.

2. Background

Firearm regulation has generally included laws or policies that regulate who can make, sale, possess, and/or modify firearms. These policies may include searching a record of a purchaser of a firearm to ensure that the purchaser is not prohibited from purchasing the firearm. Further, firearm regulation may limit where firearms may be permitted.

SUMMARY

Implementations of firearm regulation systems may include a firearm safety system (FSS) configured to physically couple to a firearm. The FSS may include a locking mechanism configured to prevent the firearm from firing and a sensor configured to detect an environmental parameter. The firearm regulation system may also include a management system communicatively coupled to the FSS and a site safety system (SSS) communicatively coupled to the management system. The SSS may include one or more lockdown mechanisms. The FSS may be configured to store a threshold corresponding to the environmental parameter. The FSS may be configured to, if the sensor detects an environmental parameter that exceeds the threshold, transmit a lock signal to the locking mechanism. The locking mechanism may be configured to lock the firearm upon receiving the lock signal. The FSS may be configured to wirelessly transmit, through a telecommunication channel, a signal to the management system indicating that the sensor detected the environmental parameter exceeding the threshold. The management system may be configured to forward the signal received from the FSS, through a telecommunication channel, to the SSS indicating that the sensor detected the environmental parameter exceeding the threshold. The SSS may be configured to, upon receiving the signal from the management system, activate one or more lockdown mechanisms.

Implementations of firearm regulation systems may include one, all, or any of the following:

The FSS may include a receiver configured to wirelessly receive a second lock signal, through a telecommunication channel, from an external device. The FSS may be configured to activate the locking mechanism upon receiving the second lock signal.

The sensor may be one of a motion sensor or a vibration sensor.

The firearm regulation system may include a GPS device configured to detect a location of the FSS and a geofence stored within the FSS. The FSS may be configured to activate the locking mechanism to lock the firearm if the location of the FSS is within an area of the geofence stored within the FSS.

The firearm regulation system may include a long range wide area network (LoRaWAN) transceiver. The LoRaWAN transceiver may be configured to receive a LoRaWAN signal and activate the locking mechanism upon receiving the LoRaWAN signal.

The firearm regulation system may include relay circuitry configured to activate and deactivate the locking mechanism. The relay circuitry may be wirelessly coupled to the locking mechanism.

The FSS may be configured to transmit, through a telecommunication channel, to an owner of the firearm, a notification indicating that the firearm has been locked after the locking mechanism has been activated.

The SSS may include a fluxgate metal detector configured to operate under an entryway of a site. The SSS may be configured to activate the one or more lockdown mechanisms upon the fluxgate metal detector detecting a predetermined amount of metal.

The firearm regulation system may include additional FSSs configured to physically couple to additional firearms.

Implementations of firearm regulation systems may include a firearm safety system (FSS) configured to physically couple to a firearm. The FSS may include a locking mechanism configured to prevent the firearm from firing, a sensor configured to detect an environmental parameter, a blue tooth low energy (BLE) receiver, and an RF identification (RFID) tag. The firearm regulation system may also include a management system communicatively coupled to the FSS and a site safety system (SSS) communicatively coupled to the management system. The SSS may include one or more lockdown mechanisms, a BLE beacon, an RF antenna, and an RF reader/writer. The FSS may be configured to store a threshold corresponding to the environmental parameter. The FSS may be configured to, if the sensor detects an environmental parameter that exceeds the threshold, transmit a first lock signal to the locking mechanism. The locking mechanism may be configured to lock the firearm upon receiving the first lock signal. The FSS may be configured to wirelessly transmit, through a telecommunication channel, a signal to the management system indicating that the sensor detected an environmental parameter exceeding the threshold. The management system may be configured to forward the signal received from the FSS, through a telecommunication channel, to the SSS indicating that the sensor detected an environmental parameter exceeding the threshold. The SSS may be configured to, upon receiving the signal from the management system, activate one or more lockdown mechanisms. The BLE beacon may be configured to transmit, through a telecommunication channel, a BLE signal configured to be received by the BLE receiver. The FSS may be configured to lock the firearm upon receiving the BLE signal. The RF antenna may be configured to detect the RFID tag when the RFID tag is within range of the RF antenna. Upon detecting the RFID tag, the RF reader/writer may manipulate the RFID tag. The FSS may be configured detect the manipulated RFID tag and may be configured to lock the firearm upon detecting the manipulated RFID tag. The SSS may be configured to activate lockdown mechanisms upon detecting the RFID tag.

Implementations of firearm regulation systems may include one, all, or any of the following:

The firearm regulation system may include relay circuitry configured to activate and deactivate the locking mechanism. The relay circuitry may be wirelessly coupled to the locking mechanism.

The firearm regulation system may include a docking station configured to receive the firearm. The docking station may include a sensor configured to detect when the firearm is removed from the docking station. The docking station may be configured to transmit a second lock signal configured to be received by the locking mechanism and the locking mechanism may be configured to lock the firearm upon receiving the second lock signal.

The one or more lockdown mechanisms may include an audible alarm.

The one or more lockdown mechanisms may include actuators configured to lock one or more doors.

The management system may be configured to transmit, through a telecommunication channel, to an owner of the firearm, a notification indicating that the firearm has been locked after the locking mechanism has been activated.

Implementations of a method of regulating a firearm may include storing a threshold in a firearm safety system (FSS). The FSS may be configured to physically couple to a firearm. The method may include detecting, through a sensor comprised in the FSS, an environmental parameter and activating a locking mechanism included in the FSS if the environmental parameter detected by the sensor exceeds the threshold. The locking mechanism may prevent the firearm from firing. The method may include wirelessly transmitting, from the FSS, to a management system, through a telecommunication channel, a signal indicating that the sensor detected an environmental parameter exceeding the threshold and forwarding the signal received from the FSS, through a telecommunication channel, to a site safety system (SSS) indicating that the sensor detected an environmental parameter exceeding the threshold. The SSS may be configured to, upon receiving the signal from the management system, activate one or more lockdown mechanisms comprised within the SSS.

Implementations of firearm regulation systems may include one, all, or any of the following:

The threshold may include a geofence and the sensor may include a global positioning system (GPS) device.

One or more lockdown mechanisms may include an audible alarm.

The method of regulating a firearm may include detecting a firearm using a metal detector comprised within the SSS.

The locking mechanism may be activated through relay circuitry wirelessly coupled to the locking mechanism.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 3 is a diagram of an implementation of a firearm safety system coupled to a management system and a site safety system;
FIG. 4 is an illustration of a locking mechanism in an "off" position;
FIG. 5 is an illustration of a locking mechanism in an "on" position.

DESCRIPTION

This disclosure, its aspects and implementations, are not limited to the specific components, assembly procedures or method elements disclosed herein. Many additional components, assembly procedures and/or method elements known in the art consistent with the intended firearm regulation systems will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such firearm regulation systems, and implementing components and methods, consistent with the intended operation and methods.

As used herein, firearm describes any weapon which uses gunpowder or any other propellant to project a projectile. By non-limiting example, types of firearms may include rifles, shotguns, handguns, carbines, machine guns, sub-machine guns, and assault rifles, whether automatic or semi-automatic. Accordingly, while particular implementations disclosed herein may describe the firearm regulation system as used with a particular firearm, it is understood that the systems disclosed herein may be modified and/or used with any other firearm.

Figure 1:
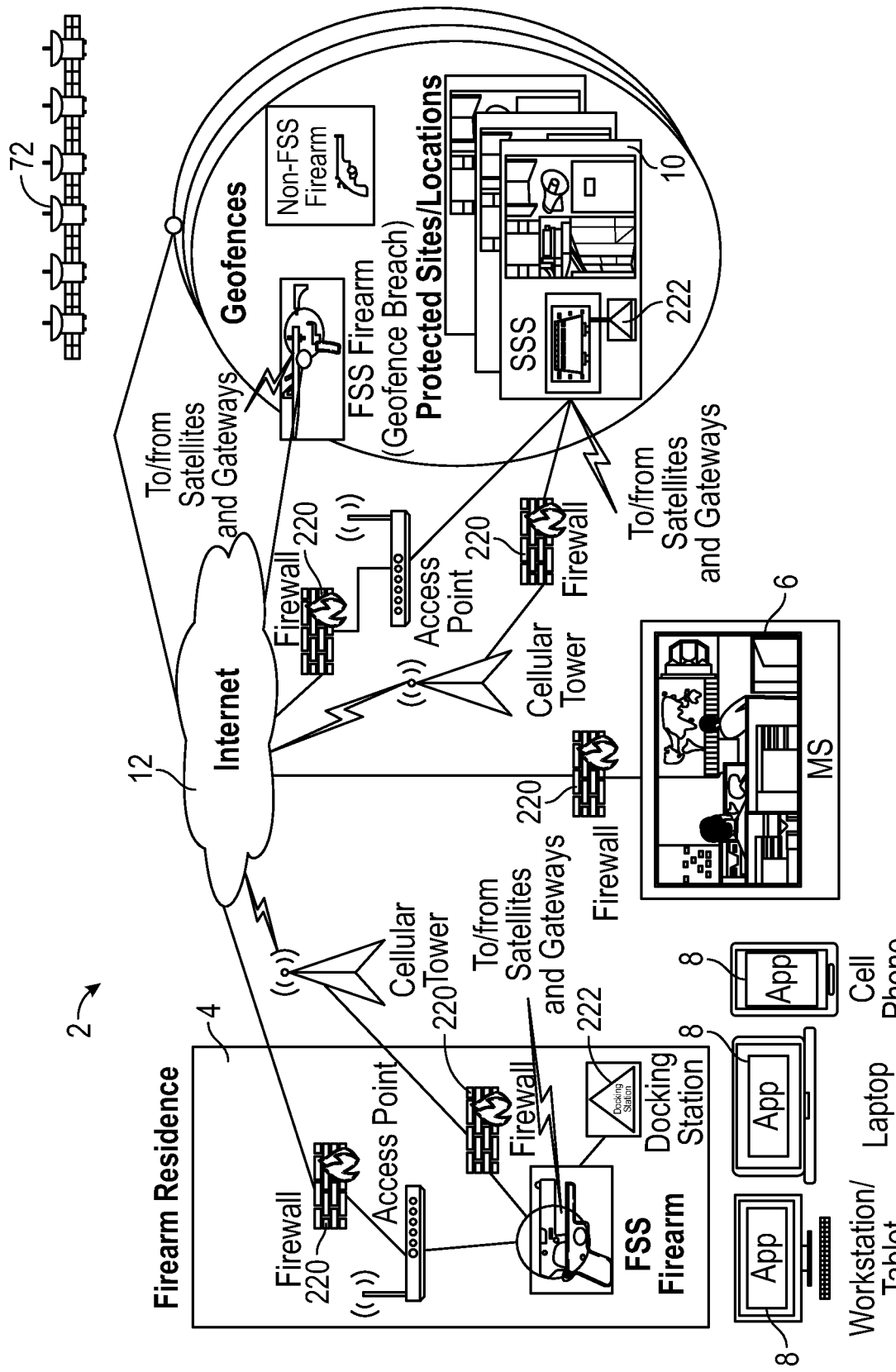
FIG. 1 is a diagram of a firearm regulation system.

Referring to FIG. 1, a diagram of a firearm regulation system is illustrated. The firearm regulation system 2 includes a firearm safety system (hereinafter "FSS") 4 communicatively and operably coupled to a management system 6. In particular implementations, the FSS 4 is coupled to the management system 6 through the internet 12, cellular communication, and/or any other type of wireless or wired communication, including any communication channel disclosed herein. In various implementations, the management system 6 may include computer-based applications configured to be operated on personal computing devices 8 for lower levels of management. In various implementations the firearm regulation system also includes a site safety system (hereinafter "SSS") 10 communicatively and operably coupled to the management system 6 and the FSS 4. In various implementations the SSS 10 is coupled to the management system 6 and/or the FSS 4 through the internet 12, cellular communication, or any other type of wireless or wired communication. The SSS 10 is coupled to a physical site or location where use of a firearm is prohibited or not desired. Examples of such sites include, by non-limiting example, schools, houses of worship, courthouses, places of business, or an individual's residence. While the implementations and illustrations disclosed herein depict a single FSS 4 in use with a single firearm, it is understood that the system may be scaled to regulate any number of FSSs coupled to any number of firearms. Likewise, while the implementations disclosed herein may depict a single SSS 10 coupled to a single site, it is understood that the SSSs may be scaled to regulate use of firearms at any number of sites. The implementations of the firearm regulation system 2 disclosed herein may allow preventative action against accidental, isolated, and mass shootings.

While the firearm regulation system 2 of FIG. 1 is illustrated as including an FSS 4, a management system 6, and a SSS 10, in other implementations any of these elements may be used alone or in combination with any other elements disclosed herein. As a non-limiting example, various implementations of firearm regulation systems may only include the FSS 4 and the management system 6, or the firearm regulation system may only include the SSS 10 and the management system.

Figure 2:
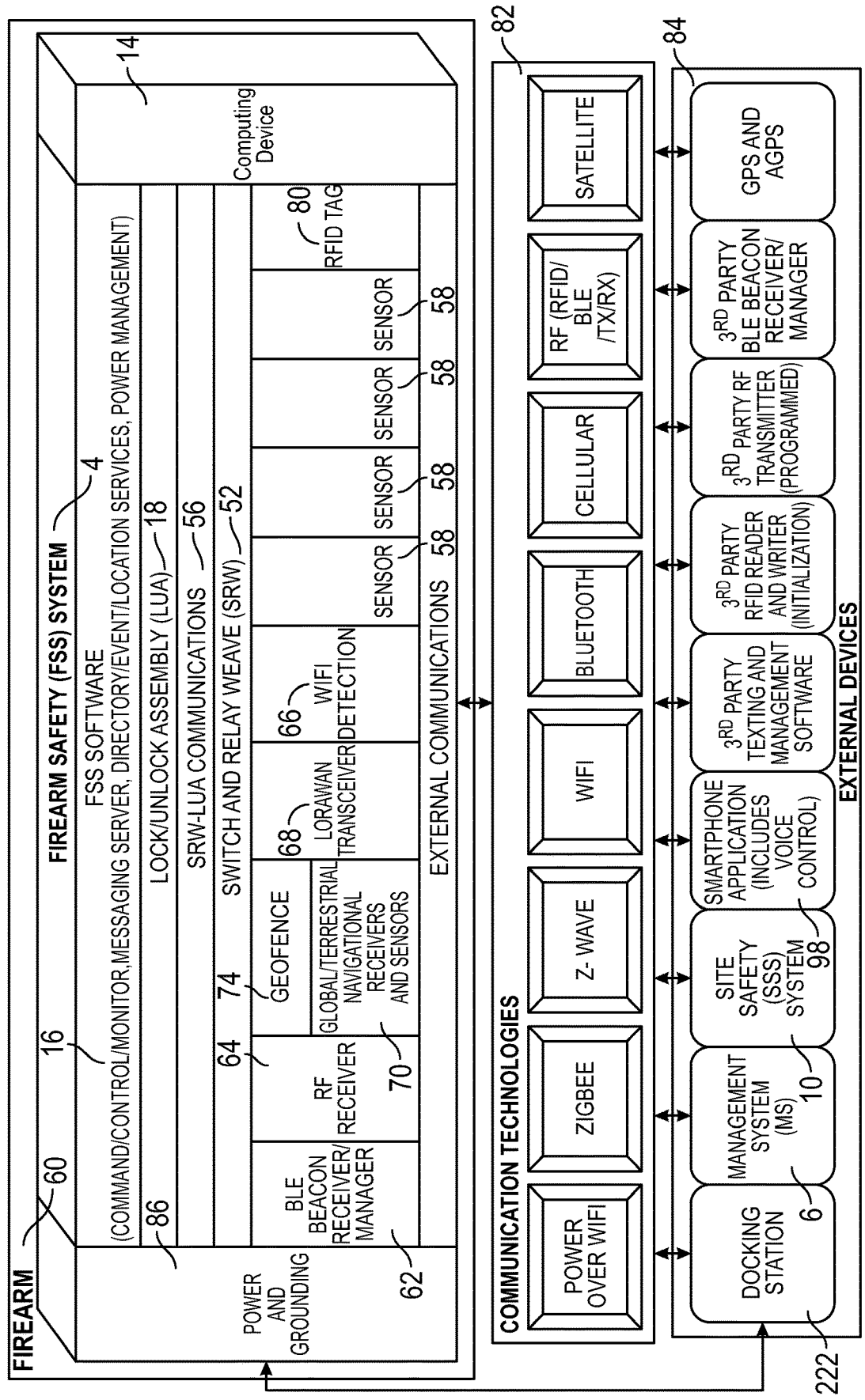
FIG. 2 is a diagram of a firearm safety system.

Referring to FIG. 2, a diagram of a FSS is illustrated. As disclosed herein, the FSS 4 is configured to physically couple to and/or within a firearm 60, lock the firearm automatically, and send alarm messages upon detecting a firearm's unauthorized use, location, and/or environment. In various implementations, the FSS may be integrally formed within the firearm and may be considered part of the firearm. In various implementations the FSS 4 is removably coupled to the firearm, while in other implementations the FSS 4 is non-removably fixed within the firearm. In implementations where the FSS 4 is non-removable, the FSS 4 may be considered tamper proof. Further, in such implementations, if a user attempts to remove or tamper with the FSS 4, a message may be sent to the management system 6 or other specified endpoints and/or users indicating as much. In other implementations, an audible alarm may sound if the FSS 4 is removed from the firearm or tampered with.

Still referring to FIG. 2, the FSS may include one or more computing devices 14. The computing devices may include a server, processor, memory, and any other hardware to enable the FSS 4 to receive data, store data, process data, and transmit data to other computing devices. As illustrated by FIG. 2, the FSS includes FSS software 16 which manages the hardware and services of the FSS. In various implementations the computing device 14 and the FSS software 16 may provide both physical mechanism anti-tampering and cybersecurity for information and data used for FSS functionality.

The FSS includes a lock/unlock assembly or locking mechanism 18. The locking mechanism 18 is configured to prevent a firearm from firing or allow a firearm to fire. In various implementations, the locking mechanism 18 may prevent the trigger of the firearm from being pulled. Referring to FIG. 3, a diagram of an implementation of an FSS coupled to a management system and an SSS is illustrated. As illustrated by FIG. 3, the FSS 20 includes locking mechanism 22. Referring to FIG. 4, the locking mechanism in an "off" position 24 is illustrated, and referring to FIG. 5, an illustration of the locking mechanism in an "on" or "activated" position 26 is illustrated.

Referring to FIGS. 4-5, the firearm 28 includes a trigger 30. The firearm 28 also includes a selector switch, or a safety 32. In various implementations, the safety 32 includes a flat portion 34 and a rounded portion 36. When the safety is on, the rounded portion 36 of the safety is oriented downwards and contacts the back end 38 of the trigger 30. This prevents the back end 38 of the trigger 30 from moving upwards, and in turn, prevents the trigger from being pulled. Contrary to this, when the safety is off (as illustrated by FIG. 4), the flat portion 34 of the safety 32 faces the trigger 30, thus creating a gap between the trigger and the safety. This allows for the back end 38 of the trigger 30 to move upwards, and in turn, allows for the trigger to be pulled, resulting in the firing of the weapon. In various implementations, the locking mechanism 22 may include a solenoid 40. In various implementations, a pin 42 may be coupled to the solenoid 40. Referring specifically to the "OFF" diagram of FIG. 4, a deactivated solenoid within a locking mechanism is illustrated. As illustrated, the coils 44 of the solenoid 40 may extend around an upper arm 46 of the pin 42 and may be fixed to the pin. The upper arm 46 may be fixedly coupled to and may be orthogonal to the main body 48 of the pin 42. In various implementations, the pin 42 also includes a lower arm 50 parallel to the upper arm 46 of the pin. Accordingly, when the solenoid 40, and in turn the locking mechanism 22, is activated (or a charge is applied to the solenoid), the coils 44 may contract, pulling the pin 42 towards the solenoid which places the lower arm 50 between the safety 32 and the back end 38 of the trigger 30, as illustrated by the "ON" diagram of FIG. 5. The lower arm 50 of the pin 42 in turn fills the gap between the safety 32 which is off and the back end 38 of the trigger 30, preventing the trigger 30 from being pulled and the weapon from firing. In implementations where the safety 32 is on and the solenoid 40 is activated, the lower arm 50 of the pin 42 would be pulled against the safety. Upon the safety 32 being turned off, or rotated, the coils 44 would then be able to contract further and the lower arm 50 of the pin 42 would fill the gap between the safety 32 and the back end 38 of the trigger 30, as illustrated by the "ON" diagram of FIG. 5.

The locking mechanism of FIGS. 3-5 is illustrative of an example of a single implementation of a locking mechanism. It is understood that other locking mechanisms may be utilized to lock the firearm and prevent the firearm from firing. Such implementations may or may not include a pin. Further, in other implementations, the locking mechanism may be integrally formed as part of the safety of the firearm in order to activate the FSS and prevent the firearm from firing.

Referring back to FIG. 2, the FSS 4 may include a switch and relay weave, or relay circuitry 52. Relay circuitry 54 is also illustrated in FIG. 3. The relay circuitry, depending on whether it is opened or closed, may activate and deactivate the locking mechanism. Referring to FIG. 2, in various implementations, the communication 56 between the relay circuitry and the locking mechanism may be wired. In other implementations the relay circuitry may be wirelessly coupled to the locking mechanism. In such implementations, the FSS may be more easily adapted for a variety of firearms as a wired path between the relay circuitry and the locking mechanism need not exist. In implementations having a wireless connection between the relay circuitry and the locking mechanism, the relay circuitry may communicate via radio frequency (RF) with the locking mechanism.

Still referring to FIG. 2, the FSS 4 may include one or more sensors 58. The one or more sensors 58 may be configured to detect an environmental parameter. As used herein, an environmental parameter refers to a parameter of the environment of the FSS, such as, by non-limiting example, location, motion or vibration of the FSS, light, humidity, sound, temperature, and/or carbon dioxide.

Accordingly, the FSS may include a light sensor, a humidity sensor, a motion sensor, a vibration sensor, a temperature sensor, a sound sensor, a carbon dioxide sensor, or any combination thereof.

In various implementations the FSS 4 is configured to receive and store one or more thresholds corresponding to the one or more environmental parameters detected by the one or more sensors 58. The threshold may be stored in the memory of the computing device 14 of the FSS 4. The one or more thresholds may be input into the FSS through a manager of the system via the management system. In various implementations, an individual, such as an owner of a firearm, may be able to input the thresholds into the firearm management system through a desktop or mobile application. In other implementations the threshold may be input into the FSS through a website. Through the same management system, applications, or website, an authorized user may also turn on and off sensors.

Using the computing device 14 and/or the FSS software 16, the FSS 4 is configured to compare the measure of environmental parameters detected by the one or more sensors 58 to the corresponding thresholds stored in the FSS. In various implementations, the one or more sensors 58 may be configured to repeatedly sample for the one or more environmental parameters and the FSS may be continuously comparing the measured environmental parameters detected by the one or more sensors to the one or more thresholds stored in the FSS.

In various implementations, if the FSS determines that one of the measured environmental parameters exceeds one or more of the thresholds, the computing device and/or the FSS software 16 of the FSS 4 may transmit a lock signal to the locking mechanism 18. The lock signal may be transmitted through the relay circuitry. In response to receiving the lock signal, the locking mechanism 18 may be activated and lock the firearm and prevent the firearm from firing.

Use of the one or more sensors may prevent accidental shootings, suicide, and isolated shootings, and/or mass shootings. For example, a light sensor may enable the firearm to be locked upon detecting light. This would result in the locking of a firearm upon unauthorized removal from a safe. Similarly, a motion sensor or vibration sensor would result in the locking of a firearm upon unauthorized movement of the firearm. A carbon dioxide sensor would result in the locking of a firearm in close quarters with a user. For example, a hunting rifle would be locked due to the amount of carbon dioxide indoors or in close quarters but would then operate when taken outside. Similarly, a humidity sensor would result in the locking of a firearm if it is exposed to excessive moisture of surrounding environment that may cause misfires. A temperature sensor would result in the locking of a firearm upon unauthorized use of the firearm inasmuch as it may detect intentionally or unintentionally induced excessive ambient temperature causing some firearms to combust upon firing.

In various implementations, the FSS 4 may be configured to transmit messages over a telecommunication channel to any of various endpoints, users (such as the owner of the firearm), and the management system indicating that a threshold had been breached and/or that the firearm has been locked. These messages may be sent through the computing device 14 and/or the FSS software 16. In particular implementations these messages may be sent through a messaging server.

In various implementations the FSS 4 may include additional sensors such as a low battery power sensor or a sensor to determine if the power supply is being removed from the FSS. Thresholds may be stored in the FSS corresponding to low battery power or removal of the power supply from the FSS 4. If the FSS 4 detects that any of these thresholds are exceeded, the FSS may lock the firearm according to any implementation disclosed herein.

Still referring to FIG. 2, in various implementations the FSS 4 includes one or more receivers or transceivers configured to receive signals. These receivers may also be considered sensors inasmuch as they are used to sense a particular signal transmitted to the FSS.

As illustrated by FIG. 2, in various implementations the FSS may include a Bluetooth low energy (BLE) receiver 62 and/or manager. In various implementations, the BLE receiver 62 may be configured to receive a BLE signal from a BLE beacon. Upon receiving the signal from the BLE beacon, the FSS 4 may be configured to lock the firearm 60. In such implementations the BLE signal may be considered a lock signal. In particular implementations, a bit of the BLE receiver 62 is manipulated upon receiving the BLE signal and the detection of the manipulated bit by the FSS 4 may result in the FSS transmitting a signal to the locking mechanism 18 to activate and lock the firearm 60.

In various implementations the FSS 4 may include an RF receiver 64 configured to receive RF signals from RF transmitters. In various implementations, the RF signal sent may be a lock signal and the FSS may be configured to lock the firearm upon receiving the RF signal.

In various implementations, the FSS 4 may include a WiFi detection device 66. The WiFi detection device 66 is configured to detect WiFi access point IDs/addresses of an available WiFi network. In the event that the available network is a protected site (meaning a site prohibiting firearms), upon detecting the protected site the FSS 4 may lockdown the firearm 60. Further, in other implementations the WiFi detection device 66 may detect connections to particular WiFi networks and the FSS 4 may activate the locking mechanism 18 if connectivity to a predetermined WiFi network is detected. As an example, an owner of a firearm may program the FSS 4 to activate the locking mechanism if connection to the owner's own WiFi network is lost as this would result in automatic locking of the firearm if removed from the owner's home (or area of WiFi network).

In various implementations the FSS 4 may include a long range wide area network (LoRaWAN) transceiver 68. In such implementations the LoRaWAN transceiver 68 may be configured to continuously transmit a LoRaWAN signal. In other implementations, the LoRaWAN transceiver 68 may be configured to transmit the LoRaWAN upon the FSS 4 activating the locking mechanism 18. If a LoRaWAN receiver of a protected site receives the signal, the particular site may transmit a message to the management system 6 which may in turn transmit a lock signal to the FSS 4 detected by the LoRaWAN receiver and prevent the firearm from firing. In other implementations the FSS including a LoRaWAN transceiver may also be configured to receive LoRaWAN signals transmitted from a particular site. In such an implementation the FSS may be configured to activate the locking mechanism of the FSS upon receiving the LoRaWAN signal.

In various implementations the FSS includes a global positioning system (GPS) device 70. While the implementations herein refer to "GPS," it is understood that GPS is used to refer to any global satellite navigation systems such as, by non-limiting example, GPS, global navigation satellite system (GLONASS), or terrestrial radio frequency waves from mediums such as cellular towers or WiFi (which may also be referred to as assisted GPS). In various implementations, the GPS devices may be marketed under the tradename IRIDIUM® by Iridium of McLean, Va. As illustrated by FIG. 1, the GPS device, and in turn the FSS 4, may be configured to receive signals from satellites 72 which allow for the GPS device 70 to calculate a position of the FSS 4.

Figure 6:
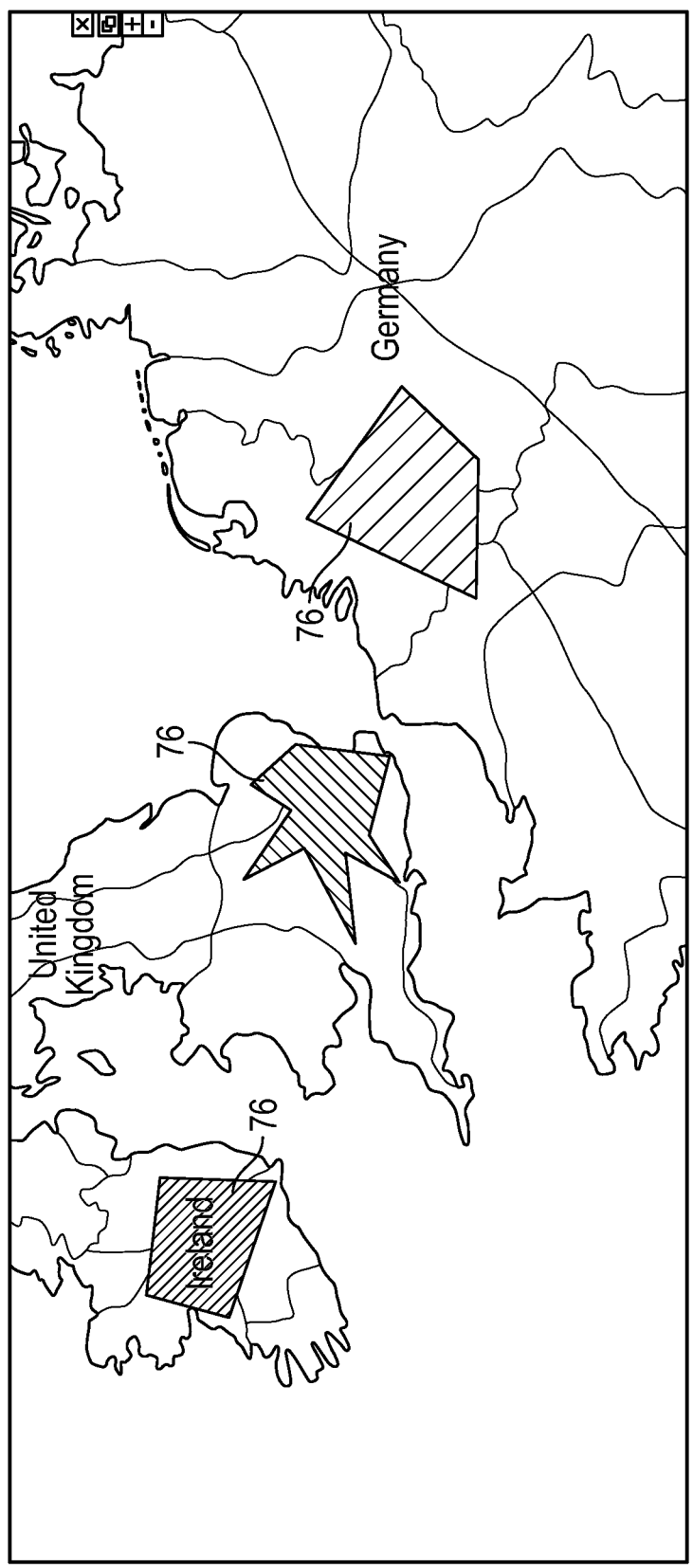
FIG. 6 is an illustration of a geofence.

In various implementations, one or more geofences 74 may be input and stored within the FSS. In various implementations, the GPS device 70 may be considered a sensor and the geofence 74 may be considered a threshold. The geofence 74 may be input and stored in the FSS using any method of inputting and storing threshold previously disclosed herein. Referring to FIG. 6, a geofence is illustrated. The geofence may cover any predetermined area intended to prohibit firearms and may cover protected sites having a SSS (as is illustrated by FIG. 1). In various implementations, and as illustrated by FIG. 6, multiple geofences 76 may be input into the FSS. Each FSS may include customizable geofences. While some geofences may apply to all FSSs, others may apply only to specific FSSs.

Referring back to FIG. 2, in various implementations, the FSS 4 may compare the location calculated by the GPS device 70 with the area of the stored geofences. If the location calculated by the GPS device 70 is within an area of a geofence stored within the FSS, the FSS may be configured to activate the locking mechanism 18 and lock the firearm 60.

In various implementations the FSS 4 may include an RF identification (RFID) tag 80. In such implementations the RFID tag 80 may be detectable by an RFID antenna or RFID reader/writer of an external device, such as an SSS. In such implementations, the RFID reader/writer may be configured to manipulate a bit of the RFID tag 80 and the detection of the manipulated bit by the FSS 4 may result in the FSS transmitting a signal to the locking mechanism 18 to activate the locking mechanism and lock the firearm 60.

The FSS 4 includes a power supply 86.

As illustrated by FIG. 2, signals and communication to and from the FSS may be transmitted using any of the communication technologies/channels 82 of FIG. 2. In various implementations, the firearm regulation system 2 may automatically switch between the possible communication channels based upon the best available channel. Further, a manager of the system may be able to enable or disable particular communication channels. Further, in various implementations the user of an FSS and/or other manager of the firearm regulation system may be able to manually over-ride the auto selection of communication channels and specify which channels to use in order of priority. The communication channels may be between the FSS 4 and any of the external devices 84 of FIG. 2.

In various implementations, the FSS 4 may be configured to activate the locking mechanism in the event that a communication channel or communication with a particular external device is disabled. For example, in various implementations, if satellite communication is lost, or if communication with the management system 6 is lost, the FSS may automatically activate the locking mechanism 18.

In various implementations the FSS 4 may be configured to automatically send a message indicating that the firearm has been locked to any of the external devices FIG. 2 when the locking mechanism has been activated, and may send the message over any available communication channels discloses herein. Further, in various implementations the message may also be sent to other endpoints or users, including the owner of the firearm. Further, the FSS 4 may be configured to send messages when any threshold has been breached (such as a firearm entering into a prohibited geofenced area).

Referring to FIG. 3, the particular implementation of the firearm regulation system illustrated includes an FSS 20 operably coupled with a management system 88 and an SSS 90. Further, as illustrated, the FSS 20 includes a GPS device 92, an RFID tag 94, and an RF receiver 96. Like the implementation illustrated by FIG. 3, various implementations of firearm regulation systems and FSSs may include only a portion of the elements disclosed in the FSS 4 of FIG. 2.

Referring back to FIG. 2, any of the external devices may be configured to transmit through any of the telecommunication channels 82 a lock signal to the FSS 4. In particular implementations, the management system 6 may transmit a lock signal to the FSS upon, among other reasons, detecting unknown login information of a user trying to access control over the FSS.

In other implementations, a user may be able to transmit a signal to the FSS through their mobile device. In such implementations the user may be able to press an SOS button which will send a message through a mobile application to the FSS to arm the device. Similarly, in various implementations a SSS 10 may include an SOS button which, when pressed, transmits a lock signal to the FSS.

Figure 7:
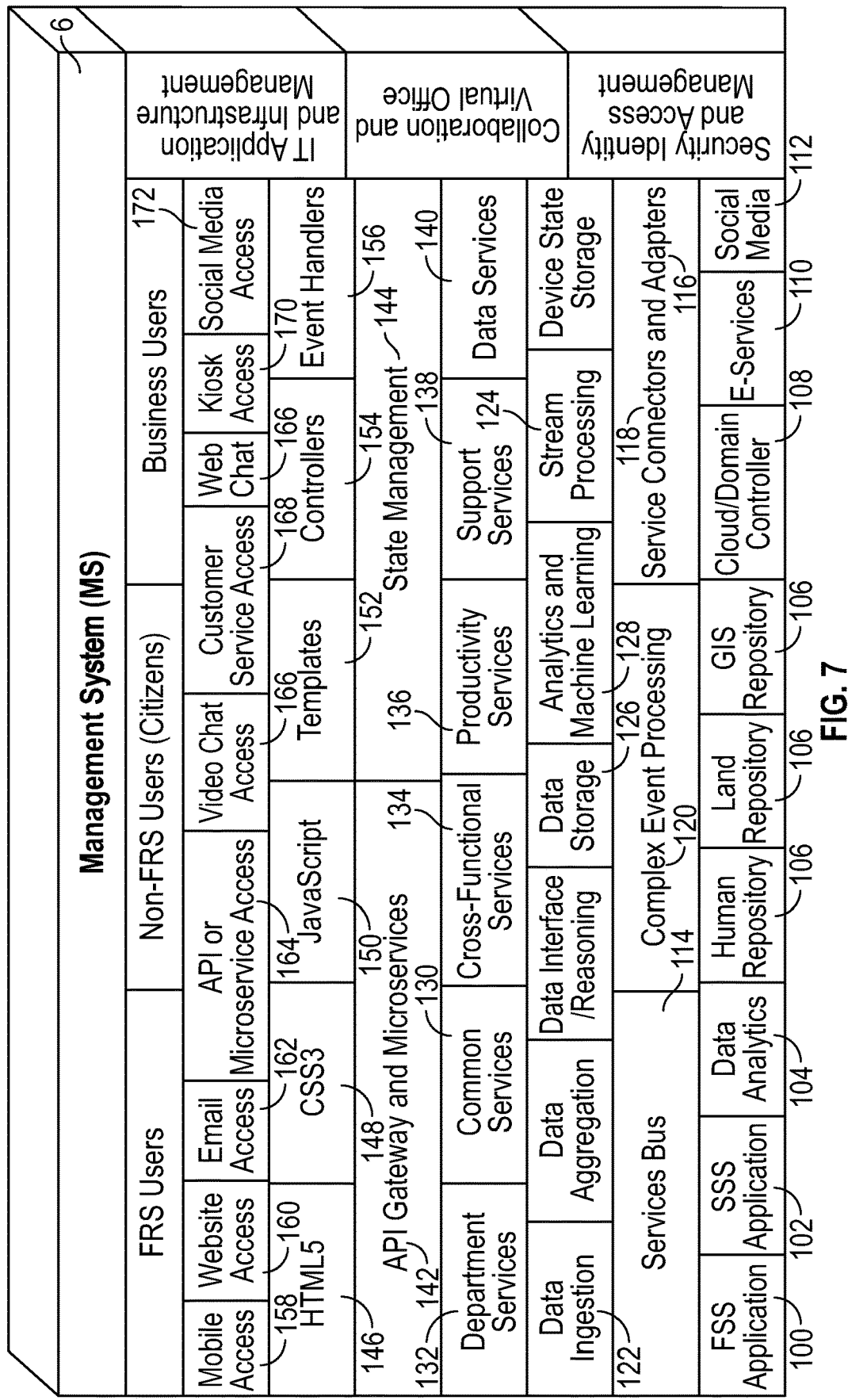
FIG. 7 is a diagram of a management system.

Referring back to FIG. 1, the firearm regulation system includes a management system 6. The management system 6 may include one or more computing devices comprising one or more servers, one or more memories, and one or more processors. Referring to FIG. 7, a diagram of a management system is illustrated. In various implementations, the management system 6 may include FSS (FSS) applications 100 (such as mobile or desktop applications) as well as SSS (SSS) applications 102. These applications may provide management of a particular FSS or a particular SSS. In various implementations the management system 6 may include data analytics 104 which may be used for raw assessment of data from the FSSs, SSSs, and the firearm regulation system. In various implementations the management system 6 may include repositories 106 for SSS managers, owners of the firearm having the FSS, other users of the firearm regulation system, stakeholders, assets, and land, geospatial, and/or geofence information. The management system 6 may include a cloud and domain controller 108 for network partitioning and management. In various implementations the management system 6 may also include e-services 110 and social media infrastructures 112.

In various implementations the management system 6 includes integration components which may include a service bus 114, adapters 116, and connectors 118 configured to integrate all of the services offered by the firearm regulation system as well as additional business infrastructure components. In various implementations the management system may also include multi-tiered event processing 120 from the FSSs and/or SSSs and the firearm regulation system network.

In various implementations the management system 6 may include management and analytics services. As illustrated by FIG. 2, in various implementations the management system 6 may include data ingestion 122, streaming and processing 124 for the FSSs and/or SSSs and the firearm regulation system. The management system 6 may also include data/device state storage 126 for the FSSs and/or SSSs and the firearm regulation system. The management system may also include analytics and raw language learning 128 for the FSSs and/or SSSs and the firearm regulation system.

The management system 6 may include firearm regulation system, high-risk geographic, and information services. In various implementations the management system 6 includes common services 130, departmental services 132, and/or cross-system services 134 for the firearm regulation system. In various implementations the management system 6 may also include productivity services 136, support services 138, and data services 140 for the firearm regulation system.

In various implementations the management system 6 may include consumer enabling services such as API gateways 142 and state management 144 for the FSSs and/or SSSs and the firearm regulation system.

In various implementations the management system 6 includes customer experience enabling services, such as html 146, JavaScript 150, CSS 148, templates 152, controllers 154, and/or event handlers 156.

In various implementations the management system 6 may include user experience enablers, such as access through mobile applications 158, websites 160, email 162, APIs 164, video/web chat 166, customer service 168, virtual and physical kiosks 170, and social media 172. Further, in various implementations, the management system may include unique portals and/or user interfaces for individual and business users of the firearm regulation system as well as non-firearm regulation system users.

All processing done by the management system 6 may be done locally or in the cloud.

Figure 8:
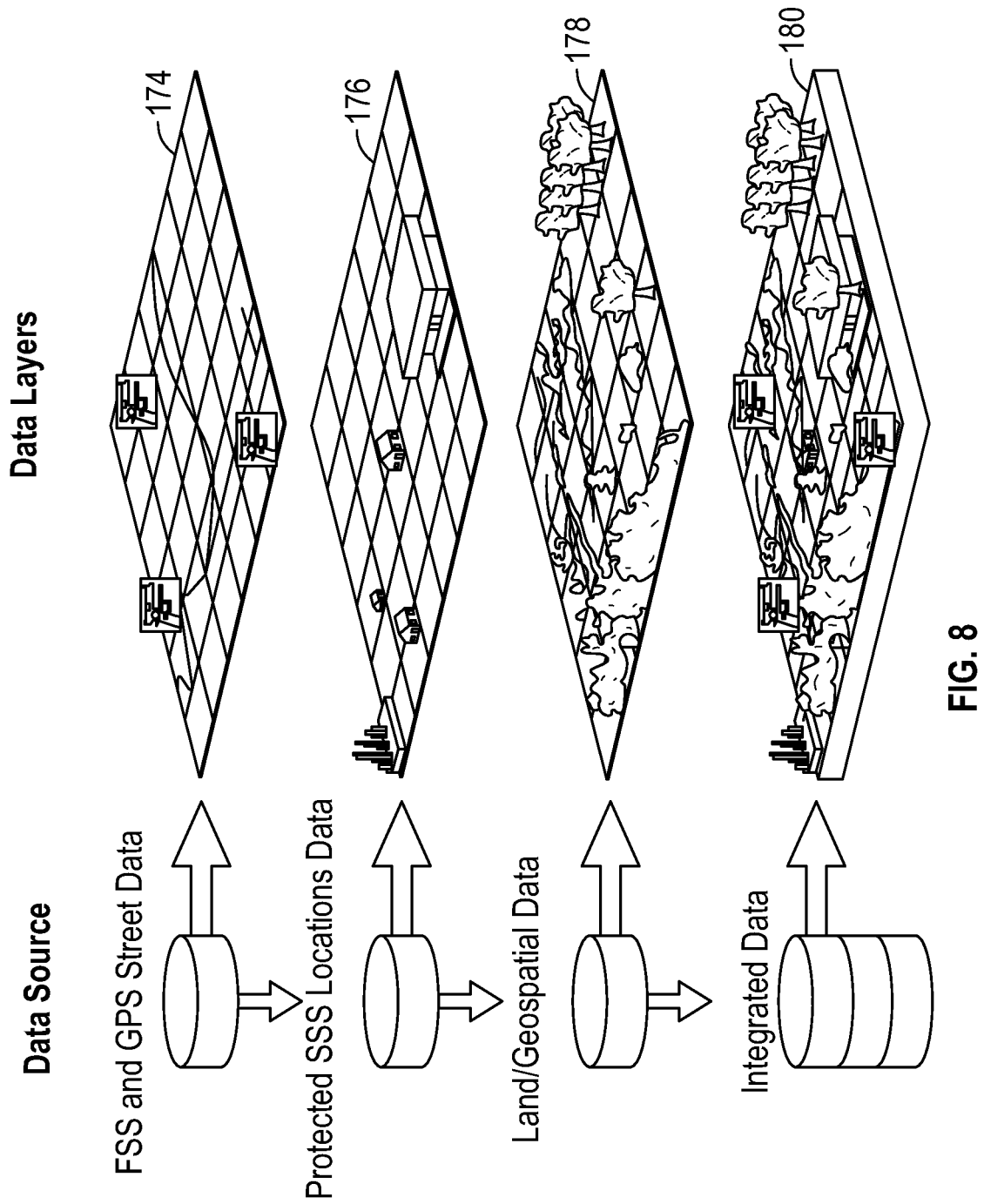
FIG. 8 is an illustration of the different levels of data used management system.

The management system 6 is configured to setup and manage the FSSs and/or SSSs. Further, the management system may be configured to setup and manage protected areas using geofences and LoRaWAN networks to provide situational awareness as varying levels of detail and from varying viewpoints. Referring to FIG. 8, an illustration of different levels of data managed by a management system 6 is illustrated. In various implementations, the management system 6 may manage any or all of a first data layer 174 derived from the FSSs and GPS street data, a second data layer 176 derived from the SSSs, and a third layer 178 derived from land and geospatial data. The management system 6 may be configured to integrate these data layers to provide a data layer 180 which is a combination of the first, second, and third data layers. The integrated layer may provide a comprehensive view and situational awareness of the firearm regulation system that may be utilized by, among others, security service providers and/or law enforcement agencies.

In various implementations the management system 6 is configured to receive, process, and forward messages from the FSS 4 to the SSS 10. In various implementations, only SSSs within a geographical range with the FSS 4 that presents a risk to the SSS may be forwarded messages from the FSS 4. These messages may include any messages indicating that a threshold has been breached or that the locking mechanism has been activated. In response to receiving such a message from the management system, the SSS may be configured to activate one or more lockdown mechanisms to protect the site as an additional layer of security from the firearm that has breached a threshold and had the locking mechanism activated. In addition to forwarding these messages, the management system 6 may be configured to forward any alarm messages sent to the management system to owners of firearms having the FSS installed, law enforcement, site managers of select sites, and any other endpoint or user on a contact list stored in the management system 6.

In various implementations the management system 6 may be configured to receive, process, and forward messages received from the SSS to site managers, law enforcement agencies, and other endpoints or users on a contact list stored in the management system 6.

Referring back to FIG. 1, the firearm regulation system 2 includes an SSS 10 operably and communicatively coupled with the management system 6 and the FSS 4. In various implementations the SSS 10 may be configured to lockdown a protected site upon receiving a lockdown message originating from a FSS. Further, the SSS 10 may be configured to lockdown a protected site upon detecting a predetermined amount of metal nearing or entering the protected site. In various implementations the SSS is also configured to transmit alarm messages to the management system 6 and/or other endpoints or users. In various implementations, the SSS 10 may be programmed to bypass automatic operation and allow manual initiation of lockdown procedures and manual sending of alarm messages.

Figure 9:
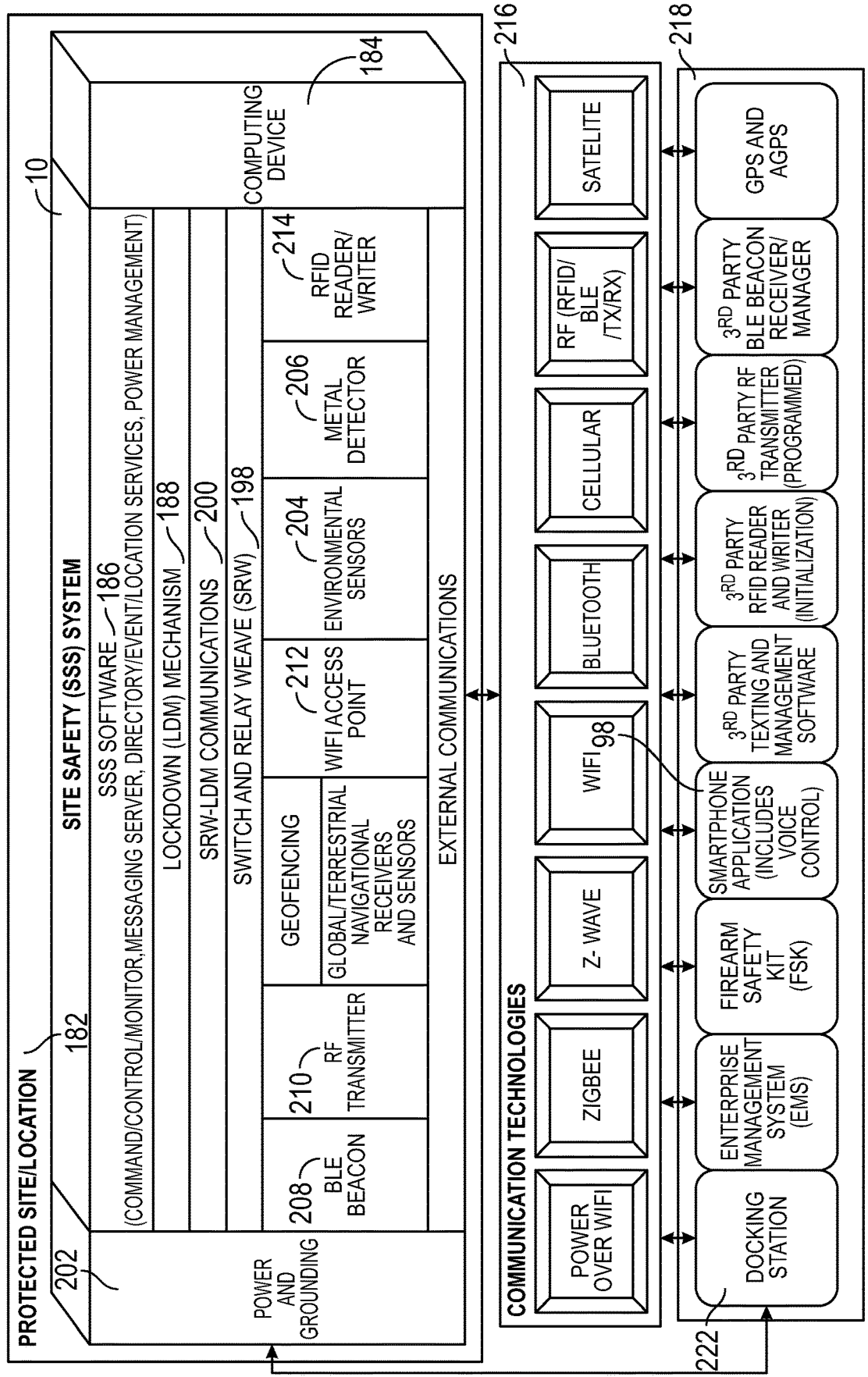
FIG. 9 is a diagram of a site safety system.
Figure 10:
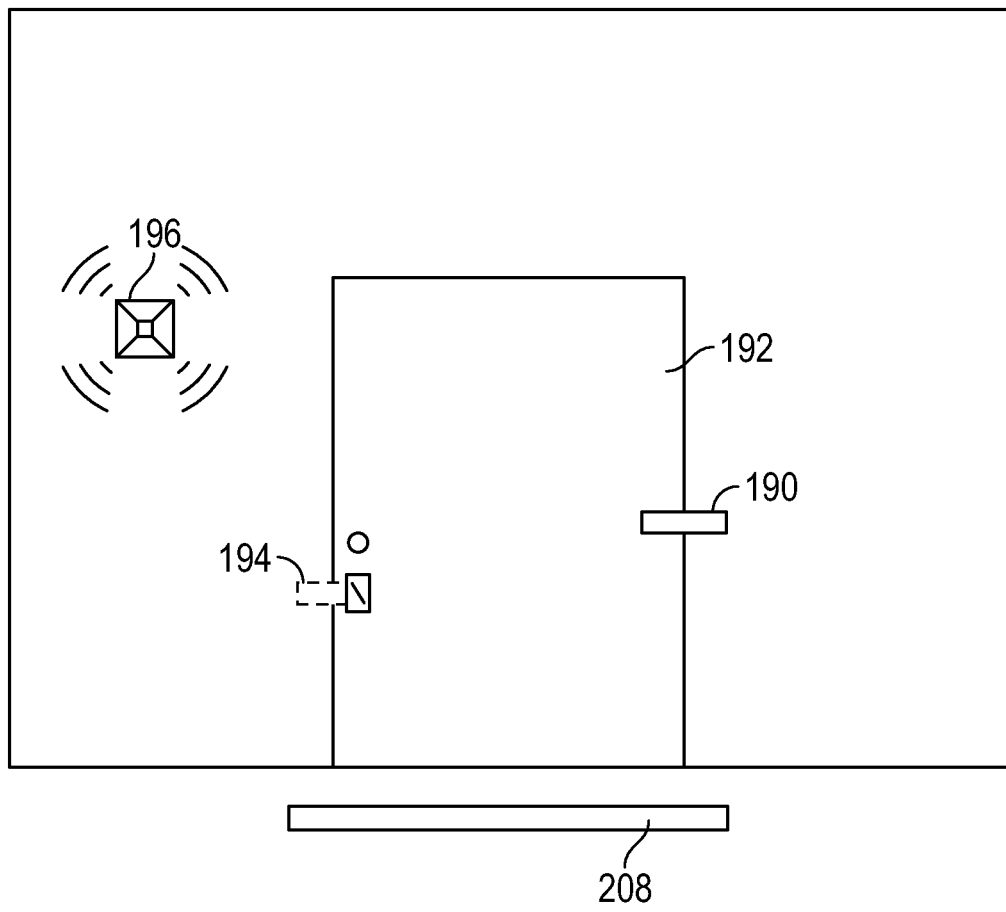
FIG. 10 is an illustration of an entryway having various lockdown mechanisms.

Referring to FIG. 9, a diagram of an SSS 10 is illustrated. The SSS 10 is configured to be installed at a site 182 intended to be protected from unwanted firearms. As illustrated by FIG. 9, the SSS 10 includes a computing device 184. The computing device 184 may include a server, processor, and memory and may include the SSS software 186 used to manage the hardware and services of the SSS 10. In various implementations, the computing device 184 in conjunction with the SSS software 186 may protect mechanisms from tampering and provide cybersecurity to protect information and data used in the functionality of the SSS 10. The SSS 10 includes lockdown mechanisms 188. The lockdown mechanisms may include devices that when activated, close doors, windows, and other entryways, lock doors, windows, and other entryways, move bulletproof panels over windows, and sound alarms. Referring to FIG. 10, an entryway having various lockdown mechanisms is illustrated. As illustrated, the lockdown mechanisms of a site may include an actuator 190 configured to close and/or lock a door 192. Further, lockdown mechanisms may include actuators configured to lock locks 194 of entryways upon activation. Lockdown mechanisms may also include one or more audible alarms 196. In various implementations, any elements of the smart locks or methods for controlling the smart locks disclosed in the following publication may be included in the SSS of the implementations disclosed herein: PCT application publication number WO2016130386, entitled "Control Method for Smart Lock, a Smart Lock, and a Lock System" to Che-Ming Ku, published on Aug. 18, 2016, the disclosure of which is hereby incorporated entirely herein by reference.

Referring back to FIG. 9, the SSS includes a switch and relay weave, or relay circuitry 198, configured to activate the lockdown mechanisms 188. The relay circuitry 198, depending on whether it is opened or closed, may activate and deactivate the lockdown mechanisms 188. Referring to FIG. 9, in various implementations, the communication 200 between the relay circuitry 198 and the lockdown mechanisms 188 may be wired. In other implementations the relay circuitry may be wirelessly coupled to the lockdown mechanisms 188. In such implementations, the SSS 10 may be more easily configured as a wired path between the relay circuitry 198 and the lockdown mechanisms 188 need not exist. In implementations having a wireless connection between the relay circuitry 198 and the lockdown mechanisms 200, the relay circuitry may communicate via radio frequency (RF) with the lockdown mechanisms.

The SSS 10 includes a power supply 202. Further, in various implementations, the SSS 10 may include one or more sensors 204 configured to detect environmental parameters. The sensors may include any type of sensor disclosed herein. Further, in various implementations, the sensors may include sound sensors configured to detect the sound of gunfire.

In various implementations the SSS 10 may include a metal detector 206. In particular implementations the metal detector 206 may be a fluxgate metal detector. In other implementations the metal detector may utilize, by non-limiting example, beat frequency oscillation (BFO) technology, very low frequency (VLF) technology, or pulse induction (PI) technology. In implementations having a metal detector, the metal detector may be configured to operate under an entryway and detect metal passing over the entryway as is illustrated by the metal detector 208 of FIG. 10. In other implementations the metal detector may be concealed in walls or other structures. In various implementations, the metal detectors may also be distributed and/or networked (wired or wirelessly) around the perimeter of a building or any physical location or area.

In various implementations the SSS 10 is configured to receive and store one or more thresholds corresponding to the one or more environmental parameters detected by the one or more sensors 204. In addition to this, the SSS 10 may also be configured to receive and store a threshold of the amount of metal to be detected. The thresholds may be stored in the memory of the computing device 184. The one or more thresholds may be input into the SSS 10 through a manager of the system via the management system. In various implementations, an individual, such as a site manager, may be able to input the thresholds into the SSS 10 through a desktop or mobile application. In other implementations the threshold may be input into the SSS 10 through a website. Through the same management system, applications, or website, an authorized user (such as a site manager) may also turn on and off sensors.

Using the computing device 184 and/or the SSS software, the SSS 10 is configured to compare the measurements of the sensors and/or metal detector to the corresponding thresholds stored in the SSS 10. In various implementations, the sensors or metal detector may be configured to repeatedly sample for the one or more parameters and/or metal and the SSS 10 may be continuously comparing the measurements detected by the one or more sensors and/or metal detector to the one or more thresholds stored in the SSS 10.

In various implementations, if the SSS 10 determines that one of the measured environmental parameters or the amount of metal detected exceeds one or more of the thresholds, the computing device and/or the SSS software of the SSS 10 may transmit a lockdown signal to the lockdown mechanism 188. The lockdown signal may be transmitted through the relay circuitry. In response to receiving the lockdown signal the lockdown mechanisms 188 may be activated and lockdown the site 182.

Use of the one or more sensors may prevent shootings at a site. For example, if a sound detector were to detect the sound of gunshots, the SSS 10 would be configured to transmit a lockdown signal to the lockdown mechanisms 188.

Similarly, if the metal detector detects a predetermined amount of metal nearing an entryway or perimeter, the SSS 10 may be configured to send a lockdown signal to the lockdown mechanisms. In other implementations, upon detecting a predetermined amount of metal, the SSS 10 may be configured to notify a site manager who can further investigate whether or not a firearm triggered the metal detector.

In various implementations, the SSS 10 may be configured to transmit messages over a telecommunication channel to any of various endpoints, individuals (such as the site manager), authorities, and the management system indicating that a threshold had been breached and/or that the site has been locked down. These messages may be sent through the computing device 184 and/or SSS software 186. In particular implementations these messages may be sent through a messaging server.

In various implementations the SSS 10 may include additional sensors such as a low battery power sensor or a sensor to determine if the power supply is being removed from the SSS. Thresholds may be stored in the SSS 10 corresponding to low battery power or removal of the power supply from the SSS 10. If the SSS 10 detects that any of these thresholds are exceeded, the SSS may lockdown the site according to any implementation disclosed herein.

Still referring to FIG. 9, in various implementations the SSS 10 includes one or more receivers, transceivers, or transmitters configured to receive and/or transmit signals. These receivers may also be considered sensors inasmuch as they are used to sense a particular signal transmitted to the SSS 10.

As illustrated by FIG. 9, in various implementations the SSS 10 may include a BLE beacon 208. In various implementations, the BLE beacon 208 may be configured to transmit a BLE signal configured to be received by a BLE receiver within an FSS. Upon the signal being received by the BLE receiver, the FSS may be configured to lock the firearm. Further, upon the BLE signal being received by the FSS, the SSS 10 may detect that the signal was received and may send a signal through the relay circuitry to activate the lockdown mechanisms.

In various implementations the SSS 10 may include an RF transmitter 210 configured to transmit RF signals. In various implementations, the RF signal sent may be a lock signal sent to an FSS.

In various implementations, the SSS 10 may include a WiFi access point 212. In the event that a FSS is within range of the WiFi access point 212, the SSS 10 may be configured to transmit a lockdown signal to the lockdown mechanisms and lockdown the site 182.

In various implementations the SSS 10 may include an RFID reader/writer 214 which may include an RFID antenna. In such implementations the RFID reader/writer 214 may detect an RFID tag within a FSS. In such implementations, the RFID reader/writer 214 may be configured to manipulate a bit of the RFID tag and the detection of the manipulated bit by the FSS 4 may result in the FSS locking the firearm. Further, in implementations where the RFID reader/writer detects the RFID tag, the SSS 10 may transmit a lockdown signal to the lockdown mechanisms.

In various implementations the SSS may include a GPS, including any type of global navigational sensor or receiver disclosed herein. In various implementations, the SSS 10 may communicate its location to any end points, users, or other destinations potentially affected by the reason for locking down the site.

As illustrated by FIG. 9, signals and communication to and from the FSS may be transmitted using any of the communication technologies 216 of FIG. 9. A manager of the site may be able to enable or disable particular communication channels to be used. The communication channels may be between the SSS 10 and any of the external devices 218 of FIG. 9.

In various implementations, the SSS 10 may be configured to activate the lockdown mechanisms in the event that a communication channel or communication with a particular external device is disabled. For example, in various implementations, if WiFi communication is lost, or if communication with the management system is lost, the SSS 10 may automatically activate the lockdown mechanisms.

In various implementations the SSS 10 is configured to automatically send a message to any of the external devices FIG. 9 when the lockdown mechanism has been activated, a FSS has been detected, or a sensor or metal detector has detected a parameter that exceeds a predetermined threshold. Further, in any place the SSS 10 is taught as sending a lockdown signal to the lockdown mechanisms, in various implementations the SSS 10 may also transmit a lockdown message to the management system and any other site managers, users, or endpoints in a contact list stored in the SSS. Further, in various implementations the SSS 10 may send a message to any users, endpoints, or systems disclosed herein indicating the threshold breached, the FSS detected, or the metal detector detected without automatically activating the lockdown mechanisms. Upon confirmation of and further investigation of the event that triggered the SSS 10 sending the message, the SSS may then send the lockdown message to the lockdown mechanisms.

In various implementations, the SSS 10 may include fewer elements than what is illustrated by FIG. 9.

Referring back to FIG. 9, any of the external devices may be configured to transmit through any of the telecommunication channels 216 a lockdown to the SSS 10.

In various implementations the user may be able to press an SOS button which will send a message to the SSS 10 to lockdown the site. The SOS button may be part of a mobile application accessible by a manager or may be part of the SSS 10.

Referring back to FIG. 1, each of the computing devices included within the SSS 10, the managing system 6, and the FSS 4 may include firewalls 220 and other cybersecurity measures.

Referring to FIGS. 1-2 and 9, in various implementations the firearm regulation system 2 may include one or more docking stations 222 coupled to the firearm security system 4 and the SSS 10. The docking stations 222 may be configured to receive, charge or power either of the FSS 4 or the SSS 10. The docking stations may charge the FSS 4 or the SSS 10 through wired or wireless methods, including power of WiFi technology. In various implementations the docking stations 222 may include one or more RF transmitters along with motion and proximity sensors that can detect a firearm on the docking station. Upon unauthorized removal of the firearm from the docking station, the RF transmitter may transmit a lock signal to the FSS and/or may send a lockdown signal to any nearby SSSs. Upon receiving the lock or lockdown signal, the locking mechanism may be configured to lock the firearm and the lockdown mechanisms may be configured to lockdown the site. Further, upon unauthorized removal, the alarm messages may be sent from the docking station to the management system as well as any other endpoints or contacts. In other implementations, the alarm messages are sent from the FSS or SSS that just received the lock or lockdown signal from the docking station 222. Further, in various implementations the docking station may include an audible and/or visible alarm that is activated upon unauthorized removal of the firearm.

As illustrated by FIGS. 2 and 9, the firearm regulation system 2 may include a mobile application 98 configured to manage either or both of the FSS 4 and the SSS 10. The mobile application may have any combination of management system 6 functionality, with the addition of a voice command capability. In particular implementations, voice commands may be input into the mobile application to any one of lock, unlock, arm, disarm, close, open, clear, reset, or secure an FSS and an SSS. The command may be wirelessly transmitted through any telecommunication channel disclosed in FIG. 2 or 9 to either of the FSS or the SSS.

In various implementations, the firearm regulation system 2 may include smart home voice capability. In various implementations, smart home protocols such as Zigbee and Z-wave can be used to control the FSS 4 and the SSS 10 via virtual assistant technologies (such as smart speakers) with the same basic voice commands used with the mobile application.

Figure 11:
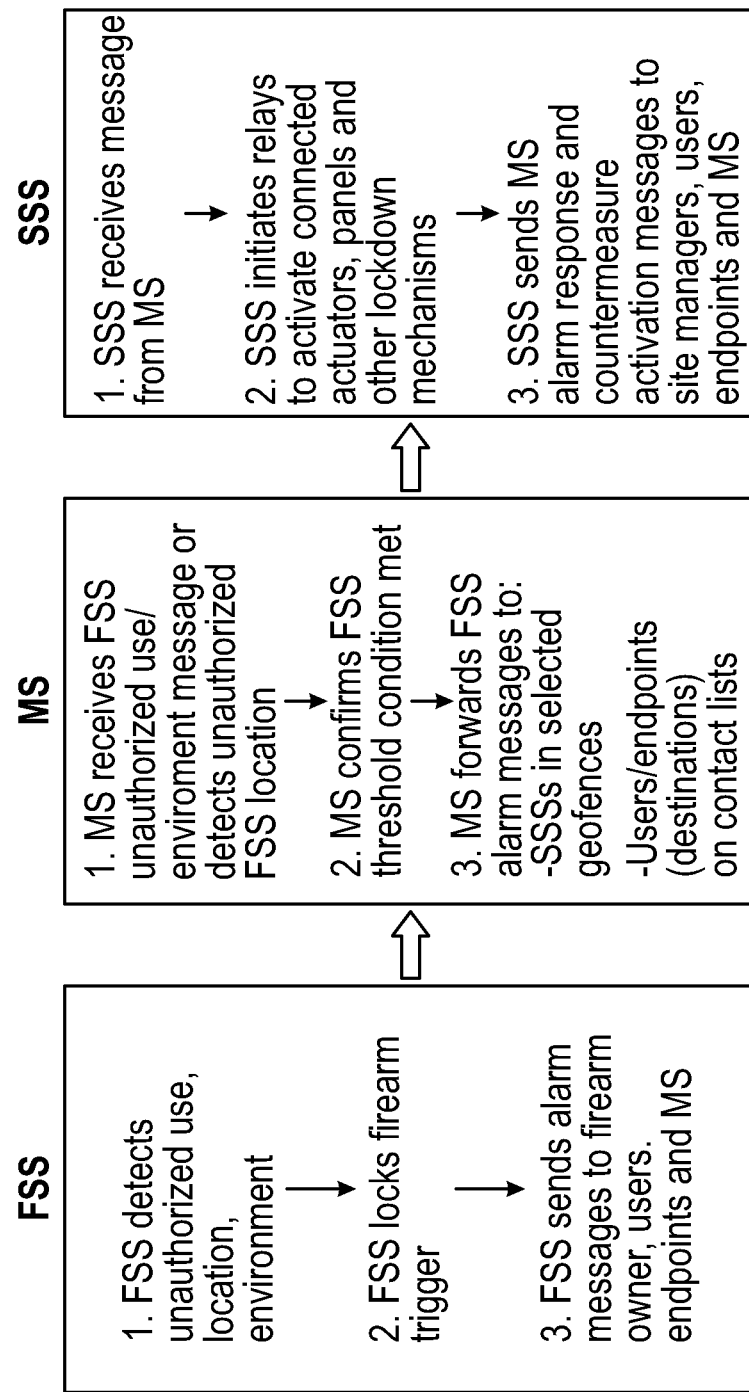
FIG. 11 is a flow chart of a method of a first implementation for regulating a firearm.

Referring to FIG. 11, a flow chart of a method of a first implementation for regulating a firearm is illustrated. It is understood that any of the elements discussed in the method of regulating the firearm may be the same as the corresponding elements described in the implementations of firearm regulation systems disclosed herein. In various implementations, the method of regulating a firearm includes inputting and storing one or more thresholds in an FSS. The thresholds may be any type disclosed herein. The method may include detecting, using the FSS, including various sensors (including any sensor disclosed herein), an environmental parameter or other parameter indicative of unauthorized use or location of the firearm. If the parameter detected by the sensor exceeds the threshold stored in the FSS, the method may include transmitting a lock signal to the locking mechanism using any method disclosed herein and activating a locking mechanism in the FSS to prevent the firearm from firing. The locking mechanism is activated through relay circuitry which may be wired or wirelessly coupled to the locking mechanism. Upon locking the firearm, the method may include transmitting a message indicating that the firearm has been locked or the parameter exceeding the threshold was detected to any of an owner of the firearm, other endpoints or users of the FSS, and/or to the management system. In various implementations, upon receiving the message from the FSS, the management system may confirm that the threshold condition was actually met and it is not a false alarm. The method may also include forwarding the message from the FSS to the SSS in selected geofences or predetermined areas along with forwarding the message to any other contacts or users stored on a contact list in the management system.

Upon receiving the message by the SSS, the method may include activating lockdown measures and mechanisms of the SSS receiving the forwarded message from the management system. The lockdown measures and mechanisms activated may include any disclosed herein. After the lockdown measures are activated, the method may include transmitting a message from the SSS to the management system, the site manager, and/or any other endpoints or users indicating that the lockdown measures were taken. The messages may be sent using any transmitter, receiver, transceiver, and/or telecommunication channel disclosed herein.

Figure 12:
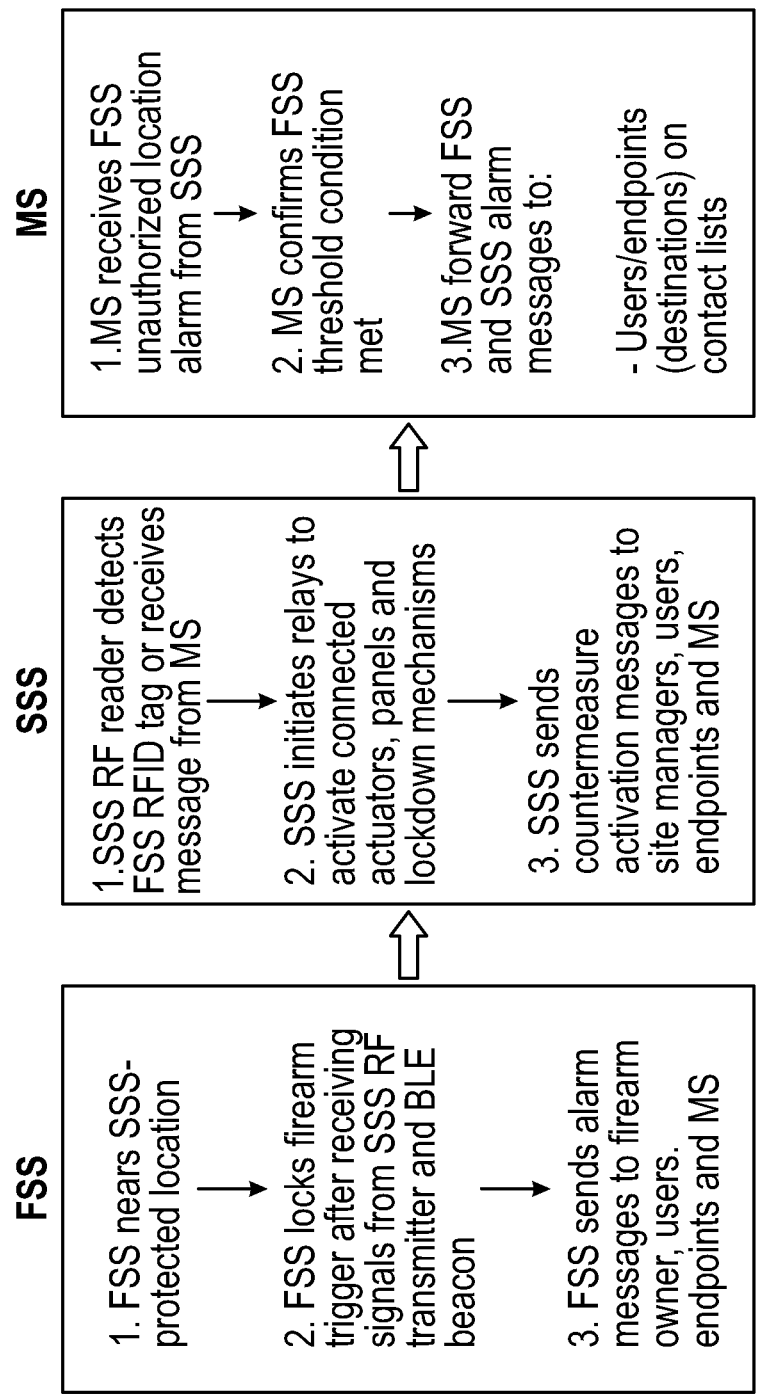
FIG. 12 is a flow chart of a method of a second implementation for regulating a firearm.

Referring to FIG. 12, a flow chart of a method of a second implementation for regulating a firearm is illustrated. In various implementations, the method of regulating a firearm may include, upon an FSS nearing an SSS protected location, the FSS locking the firearm after receiving a signal from an SSS RF transmitter, an SSS BLE beacon, or both the RF transmitter and the BLE beacon. Upon locking the firearm, the method may include sending a signal from the FSS to the firearm owner, other users or endpoints, and/or the management system. In various implementations, the method may include forwarding the signal that the firearm is locked from the management system to the SSS and/or the SSS RF reader detecting the RFID tag of the FSS. Upon either of these events taking place, the method may include the SSS activating lockdown measures, including any lockdown measures disclosed herein. The method may also include the sending messages indicating that lockdown measures have been initiated to any one of the site manager, other users and endpoints, or the management system. In various implementations, the method may include confirming that the FSS did in fact breach the threshold, or come within an unauthorized range, of the SSS. Upon confirming this condition, the method may include forwarding alerts indicating as much to any users or endpoints on a contact list stored within the management system. The messages may be sent using any transmitter, receiver, transceiver, and/or telecommunication channel disclosed herein.

Figure 13:
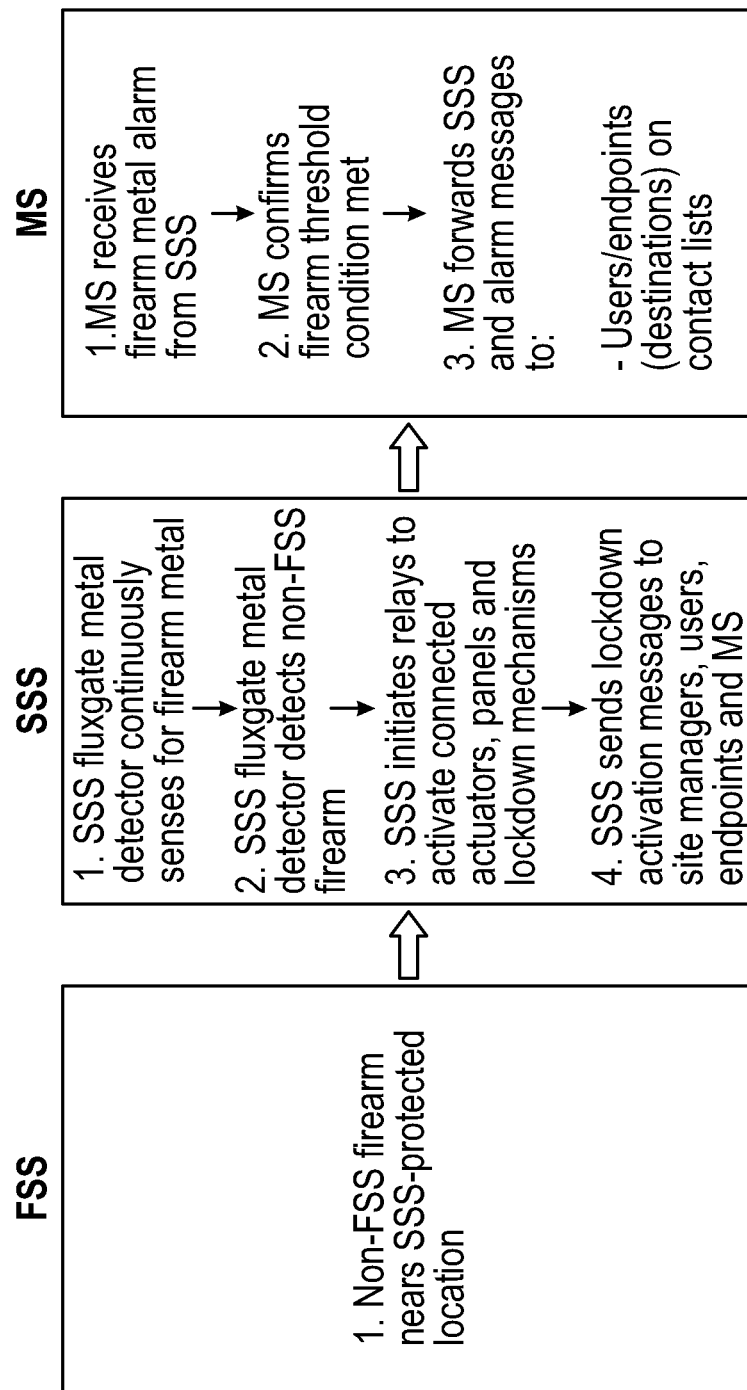
FIG. 13 is a flow chart of a method of a third implementation for regulating a firearm.

Referring to FIG. 13, a flow chart of a method of a third implementation for regulating a firearm is illustrated. In various implementations, the method of detecting a firearm may include detecting firearms not including an FSS. In such implementations, the method may include continuously sensing for firearm metal using a fluxgate metal detector. Upon a non-FSS firearm approaching the SSS, the SSS metal detector may detect the firearm. Upon detecting the firearm, the method may include activating lockdown measures and locking down the site. Upon activating the lockdown mechanisms, the method may include transmitting signals indicating that the lockdown mechanisms were activated and where they were activated to site managers, users, endpoints, and/or the management system. Upon the management system receiving the signal from the SSS, the method may include confirming, through the management system, the detection of the metal did in fact exceed the predetermined threshold. Upon confirmation, the method may include forwarding any signals to any users or endpoints on a contact list stored within the management system. The messages may be sent using any transmitter, receiver, transceiver, and/or telecommunication channel disclosed herein.

The elements of the implementations of methods of regulating a firearm may be integrated into one another. For example, in various implementations any of the methods disclosed herein may include detecting a firearm using a metal detector.

In places where the description above refers to particular implementations of firearm regulation systems and implementing components, sub-components, methods and sub-methods, it should be readily apparent that a number of modifications may be made without departing from the spirit thereof and that these implementations, implementing components, sub-components, methods and sub-methods may be applied to other firearm regulation systems.

What is claimed is:

1. A firearm regulation system comprising:
    a firearm safety system (FSS) configured to physically couple to a firearm, the FSS comprising;
        a locking mechanism configured to prevent the firearm from firing; and
        a sensor configured to detect an environmental parameter;
    a management system communicatively coupled to the FSS;
    a site safety system (SSS) communicatively coupled to the management system, the SSS comprising one or more lockdown mechanisms;
    wherein the FSS is configured to, if the sensor detects the environmental parameter, transmit a lock signal to the locking mechanism;
    wherein the locking mechanism is configured to lock the firearm upon receiving the lock signal;
    wherein the SSS is configured to, upon receiving a signal from the management system, activate one or more lockdown mechanisms.

2. The firearm regulation system of claim 1, wherein the FSS further comprises a receiver configured to wirelessly receive a second lock signal, through a telecommunication channel, from an external device and wherein the FSS is configured to activate the locking mechanism upon receiving the second lock signal.

3. The firearm regulation system of claim 1, wherein the sensor is one of a motion sensor or a vibration sensor.

4. The firearm regulation system of claim 1:
    wherein the sensor comprises a GPS device and the environmental parameter comprises a location; and
    wherein the FSS is configured to activate the locking mechanism to lock the firearm if the location of the FSS is within an area of a geofence stored within the FSS.

5. The firearm regulation system of claim 1, further comprising a long range wide area network (LoRaWAN) transceiver, wherein the LoRaWAN transceiver is configured to receive a LoRaWAN signal and activate the locking mechanism upon receiving the LoRaWAN signal.

6. The firearm regulation system of claim 1, further comprising relay circuitry configured to activate and deactivate the locking mechanism, wherein the relay circuitry is wirelessly coupled to the locking mechanism.

7. The firearm regulation system of claim 1, wherein the FSS is configured to transmit, through a telecommunication channel, to an owner of the firearm, a notification indicating that the firearm has been locked after the locking mechanism has been activated.

8. The firearm regulation system of claim 1, wherein the SSS further comprises a fluxgate metal detector configured to operate under an entryway of a site, wherein the SSS is configured to activate the one or more lockdown mechanisms upon the fluxgate metal detector detecting a predetermined amount of metal.

9. The firearm regulation system of claim 1, further comprising additional FSSs configured to physically couple to additional firearms.

10. A firearm regulation system comprising:
    a site safety system (SSS) communicatively coupled to a management system, the SSS comprising;
        one or more lockdown mechanisms;
        an RF antenna; and
        an RF reader/writer;
    wherein the SSS is configured to, upon receiving a signal from the management system, activate one or more lockdown mechanisms;
    wherein the RF antenna is configured to detect an RFID tag of a firearm when the RFID tag is within range of the RF antenna; and
    wherein the SSS is configured to activate lockdown mechanisms upon detecting the RFID tag.

11. The firearm regulation system of claim 10, further comprising a firearm safety system (FSS) configured to physically couple to a firearm, the FSS comprising a locking mechanism configured to lock the firearm.

12. The firearm regulation system of claim 10, wherein the SSS further comprises a metal detector.

13. The firearm regulation system of claim 10, wherein the one or more lockdown mechanisms include an audible alarm.

14. The firearm regulation system of claim 10, wherein the one or more lockdown mechanisms include actuators configured to lock one or more doors.

15. A method of regulating a firearm comprising:
   storing a predetermined location in a firearm safety system (FSS), the FSS configured to physically couple to a firearm;
   detecting, through a sensor comprised in the FSS, a location of the FSS;
   activating a locking mechanism comprised in the FSS if the location detected by the sensor matches the predetermined location, wherein the locking mechanism prevents the firearm from firing;
   wirelessly transmitting, from the FSS, to a management system, through a telecommunication channel, a first signal indicating that the sensor detected the predetermined location;
   wirelessly transmitting, from the management system, through a telecommunication channel, to a site safety system (SSS) a second signal;
   wherein the SSS is configured to, upon receiving the second signal from the management system, activate one or more lockdown mechanisms comprised within the SSS.

16. The method of regulating a firearm of claim 15, wherein the sensor comprises a global positioning system (GPS) device.

17. The method of regulating a firearm of claim 15, wherein one or more lockdown mechanisms comprise an audible alarm.

18. The method of regulating a firearm of claim 15, further comprising detecting a firearm using a metal detector comprised within the SSS.

19. The method of regulating a firearm of claim 15, wherein the locking mechanism is activated through relay circuitry wirelessly coupled to the locking mechanism.

* * * * *